United States Patent
Gonzalez Gonzalez et al.

(10) Patent No.: US 10,248,572 B2
(45) Date of Patent: Apr. 2, 2019

(54) APPARATUS AND METHOD FOR OPERATING A VIRTUALLY INDEXED PHYSICALLY TAGGED CACHE

(71) Applicant: ARM Limited, Cambridge (GB)

(72) Inventors: Jose Gonzalez Gonzalez, Cambridge (GB); Alex James Waugh, Cambridge (GB); Adnan Khan, Cambridge (GB)

(73) Assignee: ARM Limited, Cambridge (GB)

( * ) Notice: Subject to any disclaimer, the term of this patent is extended or adjusted under 35 U.S.C. 154(b) by 149 days.

(21) Appl. No.: 15/271,611

(22) Filed: Sep. 21, 2016

(65) Prior Publication Data
US 2017/0109289 A1    Apr. 20, 2017

(30) Foreign Application Priority Data
Oct. 15, 2015   (GB) .................................. 1518257.9

(51) Int. Cl.
G06F 12/0895  (2016.01)
G06F 12/1045  (2016.01)
G06F 12/0831  (2016.01)

(52) U.S. Cl.
CPC ...... *G06F 12/0895* (2013.01); *G06F 12/0833* (2013.01); *G06F 12/1063* (2013.01);
(Continued)

(58) Field of Classification Search
CPC ............. G06F 12/0895; G06F 12/0833; G06F 12/1063; G06F 2212/152;
(Continued)

(56) References Cited

U.S. PATENT DOCUMENTS 6,253,285 B1     6/2001 Razdan et al.
9,842,051 B1 *  12/2017 Schuttenberg ...... G06F 12/0833
(Continued)

OTHER PUBLICATIONS

Basu et.al. "Reducing Memory Reference Energy with Opportunistic Virtual Caching" IEEE 2012.*
(Continued)

*Primary Examiner* — Tuan V Thai
*Assistant Examiner* — Tasnima Matin
(74) *Attorney, Agent, or Firm* — Nixon & Vanderhye P.C.

(57) ABSTRACT

An apparatus and method are provided for operating a virtually indexed, physically tagged cache. The apparatus has processing circuitry for performing data processing operations on data, and a virtually indexed, physically tagged cache for storing data for access by the processing circuitry. The cache is accessed using a virtual address portion of a virtual address in order to identify a number of cache entries, and then physical address portions stored in those cache entries are compared with the physical address derived from the virtual address in order to detect whether a hit condition exists. Further, snoop request processing circuitry is provided that is responsive to a snoop request specifying a physical address, to determine a plurality of possible virtual address portions for the physical address, and to perform a snoop processing operation in order to determine whether the hit condition is detected for a cache entry when accessing the cache storage using the plurality of possible virtual address portions. On detection of the hit condition a coherency action is performed in respect of the cache entry causing the hit condition. This allows effective detection and removal of aliasing conditions that can arise when different virtual addresses associated with the same physical address cause cache entries in different sets of the cache to be accessed.

18 Claims, 11 Drawing Sheets

(52) U.S. Cl.
CPC ............... *G06F 2212/1032* (2013.01); *G06F 2212/1044* (2013.01); *G06F 2212/152* (2013.01)

(58) Field of Classification Search
CPC ..... G06F 2212/1032; G06F 2212/1044; G06F 12/0815; G06F 12/0831
See application file for complete search history.

(56) References Cited

U.S. PATENT DOCUMENTS

| | | | | |
|---|---|---|---|---|
| 2002/0073281 A1* | 6/2002 | Gaither | ............... | G06F 12/0811 711/122 |
| 2008/0209133 A1* | 8/2008 | Ozer | ................. | G06F 12/0822 711/146 |
| 2010/0064108 A1* | 3/2010 | Harris | ................ | G06F 12/0831 711/146 |

OTHER PUBLICATIONS

Combined Search and Exam Report for GB 1518257.9 dated Apr. 14, 2016, 6 pages.
Baylor et al., "Performance Enhancement for Multiprocessor Virtual Address Caches", IP. com., vol. 33 No. 3A Aug. 1990 IBM Technical Disclosure Bulletin, pp. 326-327.

* cited by examiner

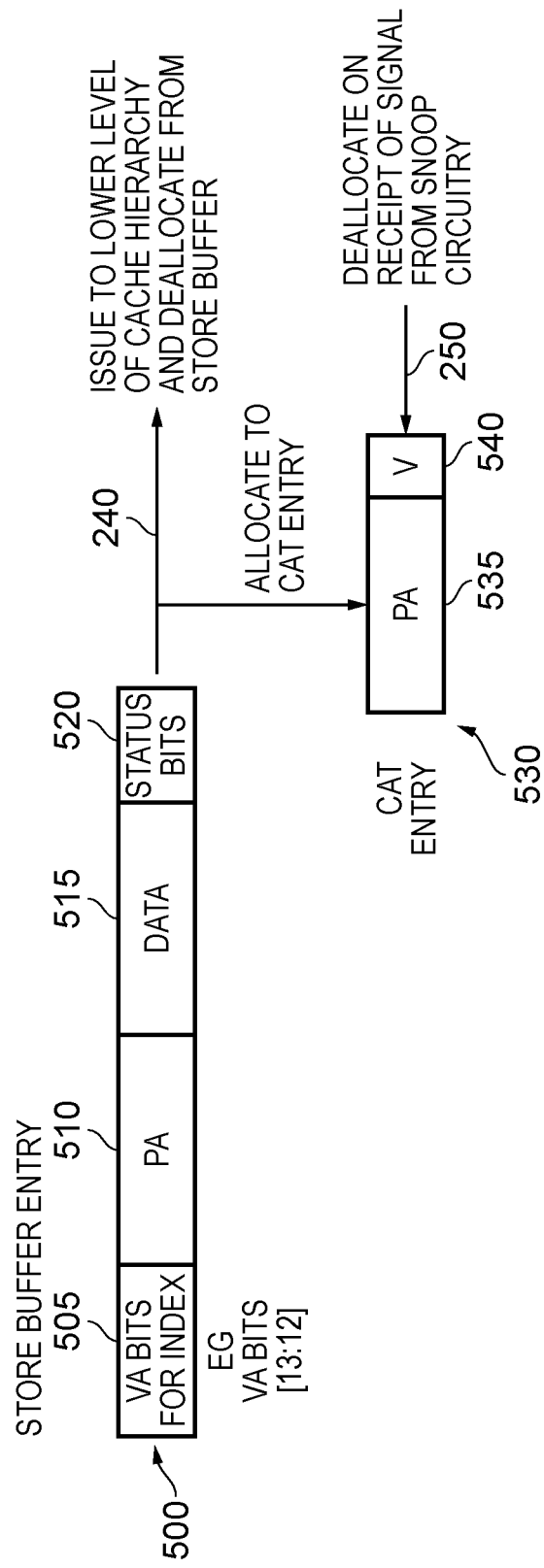

APPARATUS AND METHOD FOR OPERATING A VIRTUALLY INDEXED PHYSICALLY TAGGED CACHE

This application claims priority to GB Patent Application No. 1518257.9 filed 15 Oct. 2015, the entire contents of which is hereby incorporated by reference.

BACKGROUND

The present technique relates to an apparatus and method for operating a virtually indexed, physically tagged cache.

When using such a cache, a virtual address is used to identify a number of entries within the cache (those number of entries typically being referred to as a set within an N-way set associative cache), and then the corresponding physical address is used to determine if a hit or a miss has occurred, by comparing the relevant portion of the physical address with physical address tag values stored within the identified entries of the cache. Such an approach allows the cache lookup operation to begin in parallel with address translation, with the physical address only being needed for hit/miss determination once the tag array lookup has been performed.

However, a potential problem that can arise occurs as a result of aliasing. In particular, aliasing occurs when different virtual addresses are mapped to the same physical address. Whilst this may be allowed behaviour and may not have a negative impact per se, there are situations where it can cause complications in respect of a virtually indexed, physically tagged cache. In particular, it is possible that the different virtual addresses for the same physical address may identify different sets within the cache. This can result in duplication within the cache, reducing the effective size of the cache, and also may give rise to coherency issues due to the fact that it is necessary for the multiple different entries in the cache to have the same value.

It would be desirable to reduce the potential adverse effects of aliasing when employing a virtually indexed, physically tagged cache.

SUMMARY

In a first example configuration there is provided an apparatus, comprising: processing circuitry to perform data processing operations on data; a cache storage to store data for access by the processing circuitry, the cache storage having a plurality of cache entries, and each cache entry arranged to store data and an associated physical address portion, the cache storage being accessed using a virtual address portion of a virtual address in order to identify a number of cache entries whose stored physical address portions are to be compared with a physical address derived from the virtual address in order to detect whether a hit condition exists; and snoop request processing circuitry, responsive to a snoop request specifying a physical address, to determine a plurality of possible virtual address portions for said physical address, and to perform a snoop processing operation in order to determine whether the hit condition is detected for a cache entry when accessing the cache storage using the plurality of possible virtual address portions, and on detection of the hit condition to perform a coherency action in respect of the cache entry causing the hit condition.

In a second example configuration there is provided a method of operating an apparatus, comprising: employing processing circuitry to perform data processing operations on data; employing a cache storage to store data for access by the processing circuitry, the cache storage having a plurality of cache entries, each cache entry storing data and an associated physical address portion; accessing the cache storage using a virtual address portion of a virtual address in order to identify a number of cache entries; comparing the physical address portions of said identified number of cache entries with a physical address derived from the virtual address in order to detect whether a hit condition exists; and responsive to a snoop request specifying a physical address, determining a plurality of possible virtual address portions for said physical address, and performing a snoop processing operation in order to determine whether the hit condition is detected for a cache entry when accessing the cache storage using the plurality of possible virtual address portions, and on detection of the hit condition performing a coherency action in respect of the cache entry causing the hit condition.

In a yet further example configuration, there is provided an apparatus, comprising: processing means for performing data processing operations on data; cache means for storing data for access by the processing means, the cache means having a plurality of cache entry means, and each cache entry means for storing data and an associated physical address portion, the cache means being accessed using a virtual address portion of a virtual address in order to identify a number of cache entry means whose stored physical address portions are to be compared with a physical address derived from the virtual address in order to detect whether a hit condition exists; and snoop request processing means for determining, in response to a snoop request specifying a physical address, a plurality of possible virtual address portions for said physical address, and for performing a snoop processing operation in order to determine whether the hit condition is detected for a cache entry means when accessing the cache means using the plurality of possible virtual address portions, and on detection of the hit condition for performing a coherency action in respect of the cache entry means causing the hit condition.

BRIEF DESCRIPTION OF THE DRAWINGS

The present technique will be described further, by way of example only, with reference to embodiments thereof as illustrated in the accompanying drawings, in which:

FIG. 8 illustrates the relationship between the store buffer and the check alias table of FIG. 4 in accordance with one embodiment;

DESCRIPTION OF EMBODIMENTS

Figure 1:
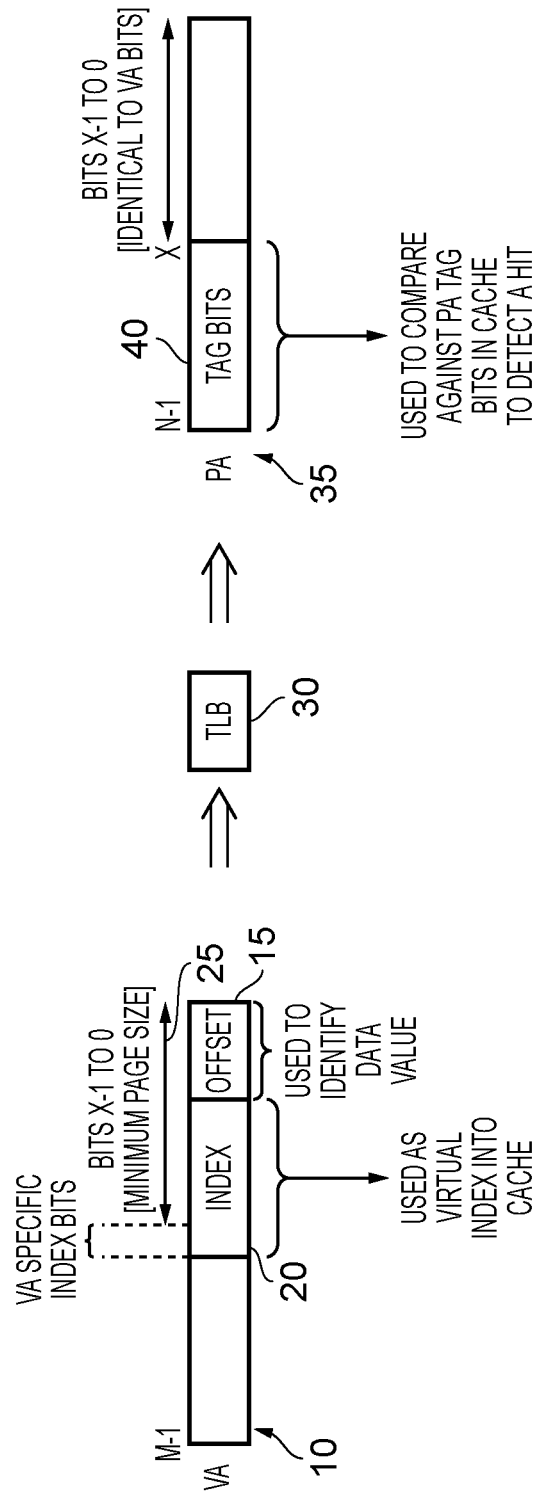
FIG. 1 is a diagram schematically illustrating the aliasing problem that can arise for virtually indexed, physically tagged caches.

Before discussing the embodiments with reference to the accompanying figures, the following description of embodiments is provided.

As mentioned earlier, aliasing is an allowed behaviour in many systems, where different virtual addresses may be mapped by an operating system into the same physical address. This can give rise to the earlier mentioned problems in virtually indexed, physically tagged caches, unless certain constraints are placed upon the cache. In particular, there are typically a certain number of bits within a virtual address that are identical to the corresponding bits in the physical address. In one embodiment, this number of bits is dependent on the minimum page size supported by the architecture. If the cache is constrained to have sufficient associativity to ensure that the number of bits required to index a cache is kept below the number of bits that are identical between the virtual address and the physical address, then this can be used to ensure that any aliasing will not give rise to a problem in the cache, since the multiple virtual addresses that are mapped to the same physical address can be arranged to produce the same index into the cache, and accordingly identify the same set. However, it would be desirable to not have to place such a constraint on the cache, and be able to effectively manage the potential problems of aliasing even in situations where the number of bits required to generate the index into the cache from the virtual address is larger than the number of bits that have identical values in both the virtual and physical addresses. In that instance, it is necessary that at least part of the index is generated from virtual address specific bits, and this can gives rise to the earlier-mentioned problem where cache entries in different sets within the cache could potentially store data relating to the same physical address.

In one embodiment, this problem is alleviated by taking advantage of a property of a snooping mechanism that may be provided within a data processing system to manage cache coherency. In particular, snooping mechanisms typically operate using physical addresses, and hence the snooping mechanisms themselves do not suffer from such potential aliasing problems.

In one embodiment, an apparatus that has processing circuitry to perform data processing operations on data and a virtually indexed, physically tagged cache storage to store data for access by that processing circuitry, is additionally provided with snoop request processing circuitry that undertakes a sequence of steps in response to a snoop request received by the apparatus, the snoop request specifying a physical address. In particular, the snoop request processing circuitry determines a plurality of possible virtual address portions for the physical address, a virtual address portion being the portion of the virtual address that is used as an index to access the cache storage. The snoop request processing circuitry then performs a snoop processing operation in order to determine whether a hit is detected in any cache entry accessed using the plurality of possible virtual address portions. As a result, when provided with a snoop request specifying a physical address, the snoop request processing circuitry can be arranged to check all of the various possible cache entries where data associated with that physical address may be stored. On detecting a hit condition, i.e. detecting a cache entry storing data for the specified physical address, the snoop request processing circuitry can be arranged to perform a coherency action in respect of that cache entry. The coherency action taken will typically depend on the type of snoop request issued. For example, the coherency action may involve invalidating the cache entry, along with performing any required eviction process if the cache entry is currently marked as valid and dirty, may involve outputting the data stored in that cache entry so that it can be provided to an external snoop circuit that was responsible for sending the snoop request, etc.

In one embodiment, it will be the case that at most the hit condition will be detected in respect of one cache entry. Hence, in one embodiment the snoop request processing circuitry is arranged to complete the snoop processing operation once the hit condition has been detected and the coherency action performed in respect of the cache entry causing the hit condition. Hence, it is not necessary to continue checking all possible virtual addresses once the hit condition has been detected.

In one embodiment, the algorithm used by the operating system to map pages in memory is used to influence the first possible virtual address portion checked during the snoop processing operation. In one particular embodiment, the first possible virtual address portion is chosen to be that virtual address portion where the virtual address specific bits have values that are set equal to the corresponding physical address bit values. It has been found that there is an increased chance of finding a hit condition for that possible virtual address portion, and accordingly such an approach can statistically reduce the overhead involved in performing the snoop processing operation.

In one embodiment, in the absence of the hit condition being detected, the snoop request processing circuitry is arranged to complete the snoop processing operation once the cache storage has been accessed using the plurality of possible virtual address portions. Hence, the snoop request processing circuitry will continue to check for hit conditions using each possible virtual address portion until either the hit condition is detected, or all possible virtual address portions have been used.

In one embodiment, the virtual address portion comprises a first subset of bits whose values are equal to corresponding bits in the physical address, and a second subset of bits that are specific to the virtual address. In one particular embodiment, the first subset of bits includes a number of bits that is dependent on the minimum page size.

In one embodiment, the above described mechanism is used to remove an aliasing condition that, via a snooping mechanism, has been identified as being present. In particular, the apparatus further comprises request issuing circuitry that is responsive to the cache storage detecting a miss condition for the various cache entries accessed using the virtual address portion of a specified first virtual address, to then issue an access request to a lower level of the cache hierarchy, specifying a first physical address derived from the first virtual address. Hence, in this scenario, based on the virtual address provided by the processing circuitry when requesting data, it has been determined that the data is not present in the cache, and accordingly the request has been propagated onto a lower level of the cache hierarchy using the physical address. However, this may trigger a snooping mechanism to check, based on the provided physical address, which caches may store a copy of the data. If it is determined that the cache storage that detected the miss is one such cache that the snooping mechanism believes holds a copy of the data, based on the provided physical address, then this indicates an aliasing condition, i.e. a situation where the required data may be stored within a different set of the cache, and hence is not located when performing the lookup based on the virtual address portion of the first virtual address.

Hence, in such situations it will be appreciated that the snoop request received by the snoop request processing circuitry is generated in response to external snoop circuitry indicating that data for the first physical address is stored in the cache storage, thereby indicating the above-mentioned aliasing condition. In such a scenario, the earlier described operation of the snoop request processing circuitry, and in particular the performance of the earlier-mentioned snoop processing operation, serves to remove the aliasing condition. In particular, if the data is indeed present in a cache entry of the cache that is in a different set to the one subjected to the initial lookup operation based on the first virtual address, that hit condition will be detected and appropriate action can be taken to remove the aliasing condition.

It should also be noted that in some embodiments, despite the snoop request indicating the presence of the aliasing condition, the aliasing condition may in fact not be present by the time the snoop request processing circuitry performs the snoop processing operation, due for example to certain race conditions, where the external snoop circuitry's information is effectively out of date by the time it is actioned by the snoop request processing circuitry.

There are a number of ways in which the aliasing condition can be removed, but in one embodiment the snoop request processing circuitry is arranged to perform, as the coherency action, an invalidate operation to invalidate the cache entry causing the hit condition, so as to remove the aliasing condition by invalidating in the cache the cache entry whose stored data is associated with the first physical address but which is accessed using a virtual address portion derived from a virtual address different to the first virtual address. Such invalidation may include eviction of the stored data from the cache in the event that that cache entry is marked as valid and dirty. Thereafter, the processing of the miss condition can continue in the standard manner, resulting in the up-to-date requested data being accessed. However, if that process results in the cache being populated with the accessed data, it will be ensured that the cache at that stage only has a single copy, due to the above-mentioned steps taken to remove the aliasing condition.

Whilst the above described approach provides an effective mechanism for removing an aliasing condition, an issue could still arise when handling a particular type of store request referred to as a non-allocating store request. Such a non-allocating store request is a request which causes a lookup to be performed within the cache in order to determine if the cache already stores data for the specified address. If so, then the store is processed with reference to the cached copy. However, in the case of a miss being detected, the store request is sent directly to the next level of cache, and no allocation is made into the cache where the miss was detected. Such a non-allocating store request is also referred to herein as a write streaming store request.

The problem that can arise with such an approach is that if the non-allocating store request used a different virtual address to a virtual address used by a previous cacheable access request that resulted in a cache entry being populated in the cache, but in a different set to the one accessed based on the virtual address specified by the non-allocating store request, a miss in the cache will take place, and then the processing of the non-allocating store request will result in the data being updated at a lower level of the cache hierarchy/memory. Hence the original data stored in the cache will then be out of date. If a subsequent cacheable access request then specifies the same virtual address as the original access request that resulted in the cache entry being populated, it will detect a hit in the cache, and hence access that out-of-date data.

In one embodiment, this problem is alleviated through the provision within the apparatus of buffer circuitry to allocate to a buffer entry the physical address associated with a non-allocating store request issued by the processing circuitry and for which the miss condition is detected in the cache structure. Hence, the buffer circuitry provides a temporary record of that physical address allowing a check to be made when required. Further, the buffer circuitry is arranged to be responsive to a deallocation signal from the external snoop circuitry to deallocate the physical address from the buffer entry of the buffer circuitry. Hence that temporary record is maintained until such time as the deallocation signal from the external snoop circuitry is received.

The timing of the sending of the deallocation signal will in one embodiment vary dependent on the situation. In particular, in one embodiment the snoop request processing circuitry is arranged to issue a response signal to the external snoop circuitry once the snoop processing operation has completed, and the buffer circuitry is arranged to receive the deallocation signal from the external snoop circuitry once the external snoop circuitry has received that response signal. Hence, when an aliasing condition has been detected, then only once the snoop request processing circuitry has performed the snoop request processing operation in order to remove the aliasing condition, will the buffer circuitry be arranged to receive the deallocation signal and hence remove the relevant physical address from the buffer circuitry.

Further, in one embodiment, if the external snoop circuitry determines that data for the physical address is not stored in the cache structure, then there is no need for a snoop request to be issued to the snoop request processing circuitry, and hence no need for the snoop processing operation to be performed. In that event, the external snoop circuitry can issue the deallocation signal to the buffer circuitry as soon as it has determined that data for the physical address is not stored in the cache structure, and accordingly there is no aliasing condition.

In one embodiment, the buffer circuitry can be incorporated as part of an existing store buffer circuit used to buffer pending store requests. However, in an alternative embodiment the buffer circuitry is separate to such store buffer circuitry, and a process of removing the non-allocating store request from the store buffer circuitry triggers the buffer circuitry to allocate the physical address of the non-allocating store request to one of its buffer entries. This can provide some performance and area efficiency gains, since it avoids the need to retain entries in the store buffer circuitry longer than they might otherwise be required. Further, the amount of information that needs to be retained in the buffer circuit is significantly less than the information that needs to be kept in the store buffer circuit, since essentially the buffer circuitry merely needs to keep the physical address so that that physical address can be checked.

In one embodiment there can be a number of cycles where the physical address is allocated in both the buffer circuitry and the store buffer circuitry, due to the allocation into the buffer circuitry occurring at an early stage in the removal process before the non-allocating store request has actually been removed.

In one embodiment, the non-allocating store request is removed from the store buffer circuitry after the request issuing circuitry issues a corresponding access request specifying the physical address for the non-allocating store request, following a miss condition being detected in the cache storage. Hence, once the store request has been propagated on to the next level of the cache hierarchy, then at this point it can be removed from the store buffer circuitry, and the physical address can be allocated into the buffer circuitry.

In one embodiment, the apparatus further comprises buffer checking circuitry in order to reference the above-mentioned buffer circuitry under certain conditions, in order to detect potential problem cases. In particular, in one embodiment the buffer checking circuitry is responsive to a cacheable access request issued by the processing circuitry (which may be a cacheable load request or a cacheable store request), to check whether the physical address for that cacheable access request is already allocated to a buffer entry of the buffer circuitry. The miss condition is then considered to exist when the physical address for that cacheable access request is determined to be already allocated to a buffer entry of the buffer circuitry, irrespective of a result of an access to the cache storage using the virtual address portion associated with the cacheable access request. Hence, for a cacheable access request, irrespective of whether a hit is detected in the cache storage based on the virtual address portion, the access will be treated as missing in the cache if the physical address for that cacheable access request is found to be allocated in the buffer circuitry. This prevents the processing circuitry potentially obtaining out-of-date data from the cache in the event of a load, or storing incorrect data in the cache in the event of a store. Further, the earlier described processing that is performed in the event of a miss will remove any aliasing condition that does exist within the cache. Thus it can be ensured that the processing circuitry will process the correct data and that any aliasing condition is detected and removed.

In one embodiment, the earlier-mentioned operation of the snoop request processing circuitry can be enhanced to provide some additional functionality, and in particular to monitor the buffer circuitry. In one embodiment the snoop request processing circuitry is responsive to a buffer entry having been allocated a physical address, to determine a plurality of possible virtual address portions for that physical address, and to perform an aliasing removal operation in order to determine whether the hit condition is detected for a cache entry when accessing the cache storage using the plurality of possible virtual address portions. On detection of the hit condition an invalidation of the cache entry causing the hit condition is performed. Hence, in such embodiments the snoop request processing circuitry can proactively seek to remove potential aliasing conditions without needing to wait for specific snoop requests from the external snoop circuitry. In one embodiment, the aliasing removal operation is performed as a background task of the snoop request processing circuitry, and hence takes a lower priority than the snoop processing operations performed in response to snoop requests.

In another example embodiment there may be provided a system comprising a plurality of processing units having cache storages, at least one of the processing units comprising an apparatus as per the embodiments described above, and snoop circuitry to implement a cache coherency protocol in respect of the cache storages of the plurality of processing units, the snoop circuitry being arranged to issue the snoop request to the snoop request processing circuitry of said apparatus.

Particular embodiments will now be described with reference to the Figures.

FIG. 1 is a diagram schematically illustrating the aliasing problem that may arise within virtually indexed, physically tagged caches. A virtual address 10 is typically input to a translation lookaside buffer (TLB) 30 in order to covert that virtual address into a physical address 35. In systems that allow aliasing, it is possible that the operating system may map multiple virtual addresses to the same physical address. As shown in FIG. 1, there are a certain number of bits 25 identified in this example as bits X−1 to 0 that have the same values in the virtual address as the corresponding bits in the physical address. The number of bits in the portion 25 is dependent on the minimum page size allowed in memory. If the index portion of the virtual address required to be used to identify the set within the cache to be accessed can be constrained to reside solely within the portion 25, it can be ensured that any such aliasing will not cause issues in the cache, since all of the different virtual addresses corresponding to the same physical address will have the same index, and accordingly will access the same set.

However, as shown in FIG. 1 it may be the case that the cache is organised in such a way that this constraint is not possible, and additional virtual address specific index bits need to be included within the index portion 20 of the virtual address. Accordingly, due to the presence of the virtual address specific index bits within the index portion 20, it will be appreciated that in the presence of aliasing, it is possible that different virtual addresses related to the same physical address will cause different sets in the cache to be accessed, which would allow multiple versions of the same data to be held within the cache. Such a scenario not only reduces the effective size of the cache, but also adds complexity due to the need to maintain coherency locally between those various copies of the data within the cache. The techniques that will be described hereafter aim to provide a mechanism for identifying and effectively removing any such aliasing condition where there is the potential for multiple versions of the same data to be held within the cache.

FIG. 1 also shows various other portions within the virtual address and the physical address. In particular, the offset portion 15 of the virtual address 10 is used to identify a particular data value of interest within an accessed cache line, as will be discussed in more detail later with reference to FIG. 2. Considering the physical address 35, then the portion 40 identifies the tag bits of the physical address, i.e. the bits of the physical address other than bits X−1 to 0 that are governed by the minimum page size and whose value is identical to the associated bits within the virtual address. In a virtually indexed, physically tagged cache, then each cache entry accessed using the index will store physical address tag bits, which can then be compared with the tag bits portion 40 of the physical address 35 in order to detect whether there is a hit, i.e. whether the tag bits in the cache entry match those physical address tag bits. This process will be discussed later with reference to FIG. 2.

By way of specific example, if the minimum page size is considered to be 4 KB (i.e. 4 KBytes), then X=12, and accordingly the virtual address bits 11 to 0 will be equal to the physical address bits 11 to 0. In one particular example, bits 5 to 0 will be used as the offset portion 15. If the cache is a 64 KB 4-way set associative cache, then the index portion 20 requires 8 bits, and in the example arrangement of FIG. 1, this will mean that the index portion 20 is formed from the virtual address bits 13 to 6, and hence has two virtual address specific bits.

Whilst in FIG. 1 the virtual address specific index bits are contiguous with the remaining bits of the index portion governed by the minimum page size, in other embodiments the virtual address specific bits can be taken from other parts of the virtual address, and accordingly the example where the virtual address bits 13 and 12 are used as the virtual address specific index bits is merely an example.

Further, the number of bits M forming the virtual address may or may not be different to the number of bits N forming the physical address, but in one embodiment M is large than N.

Figure 2:
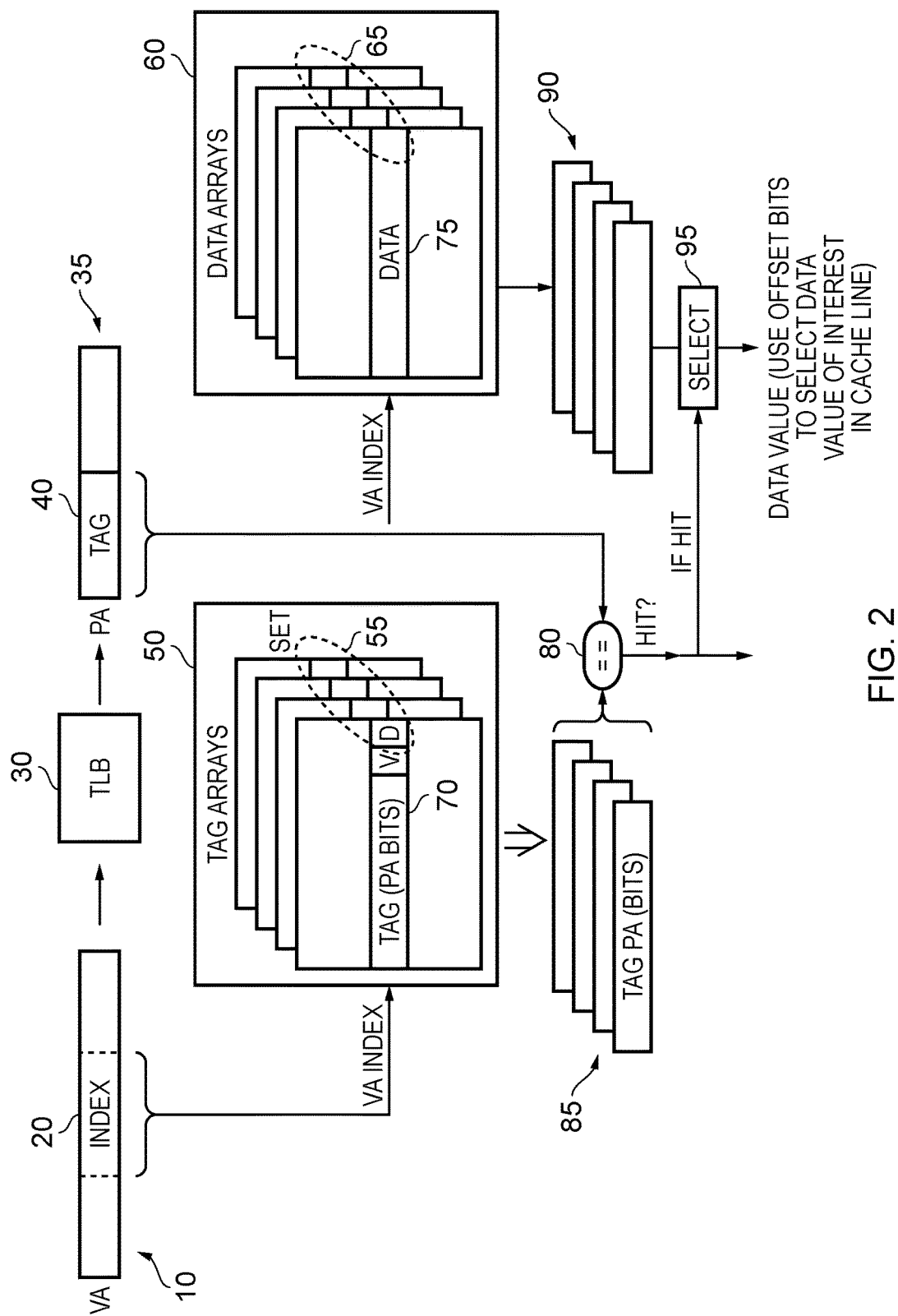
FIG. 2 schematically illustrates how a virtually indexed, physically tagged cache is accessed in accordance with one embodiment.

FIG. 2 illustrates how a virtually indexed, physically tagged cache is accessed in one embodiment. Each cache entry within the cache is formed from a tag entry 70 in one of the tag arrays 50 and a corresponding cache line 75 of data values within the corresponding data array 60. The tag arrays 50 are accessed using the index portion 20 of the virtual address 10 in order to identify one tag entry from each of the tag arrays, a tag array being provided for each way of the cache. The group of tag entries accessed is referred to as the set, as shown by the reference numeral 55 in FIG. 2.

It will be appreciated that the initial access to the tag arrays 50 can be performed prior to translation of the physical address, since only the index portion 20 from the virtual address 10 is required. However, in a virtually indexed, physically tagged cache, the tag bits held within each tag entry 70 are actually physical address bits, and accordingly the physical address will be required in order to detect whether a hit or a miss has occurred in the cache. Accordingly, in parallel with the initial lookup in the tag arrays 50, the TLB 30 can be accessed in order to generate the physical address 35, and hence the relevant tag portion 40 of the physical address which needs to be compared with the tag bits accessed from the tag arrays. As shown schematically in FIG. 2, each tag entry can additionally include certain status bits, such as a valid bit indicating whether the associated cache line of data stores valid data, and a dirty bit indicating whether the data is dirty, i.e. is more up-to-date than the data stored in memory. When accessing the tag arrays using the virtual address index 20, then the various tag bits will be output for any valid entries, as shown schematically by the reference numeral 85. These can then be compared by a comparison block 80 with the physical address tag portion 40. In the event of a match being detected, a hit condition is indicated, identifying that the data that is the subject of the access request is stored in the data arrays 60.

For a load operation, the data arrays 60 can be accessed in parallel with the tag array lookup, in order to access the various cache lines within the set, indicated by the reference numeral 65. The data in the cache lines can then be output, as indicated by the reference numeral 90, so that in the event of a hit the select circuitry 95 can then select the cache line corresponding to the tag entry which caused the hit, with the offset bits 15 from the virtual address being used to identify the particular data value the subject of the access. That data value can then be output from the cache back to the processing circuitry that issued the access request with the virtual address. It will be appreciated that there are a number of ways of accessing the particular required data value within the hit cache line, and for example a sequence of multiplexers may be used to identify the required data value to access.

In the event of a store access request that is cacheable, the data arrays are not accessed in parallel with the tag array access, but instead the physical address is first calculated, and then an entry for the store access request is placed within a store buffer once the load/store pipeline within the processing circuitry has determined that the store operation can be committed, i.e. that the write data to be written to memory is now safe to be written out to memory. Once the write access request has been stored in the store buffer along with the physical address, then a lookup within the tag arrays may be performed, and in the event of a hit the write data specified can be used to update the relevant cache line within the cache. This can happen directly in the event of an exclusive write, where it can be guaranteed that the data is not shared with another core. In the event of a non-exclusive write, even if there is a hit in the cache, the access is treated as a miss, in order to invoke external snoop circuitry to invalidate any other copies of the data that may be held in other caches, whereafter the data can then be written into the cache.

Figure 3:
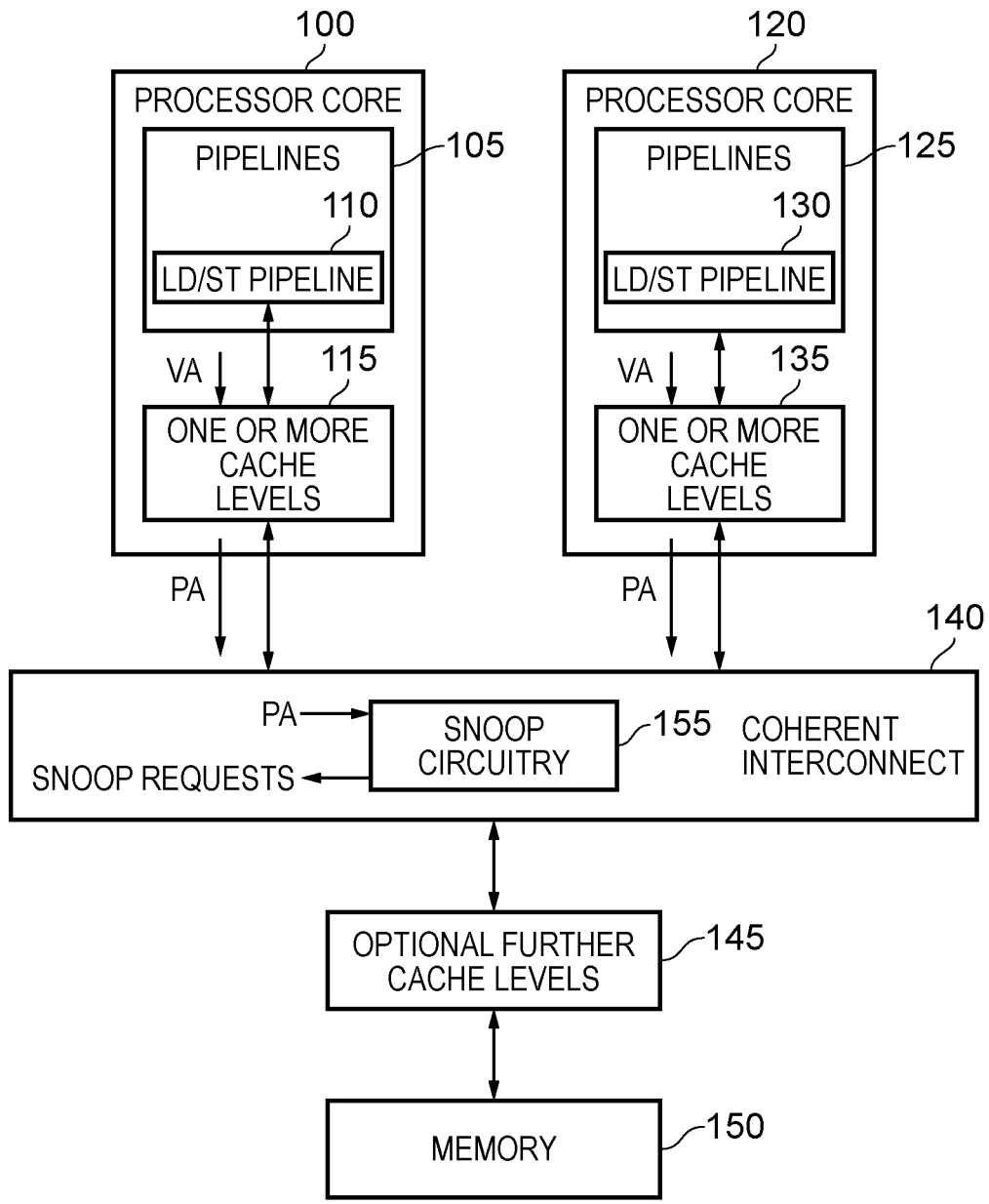
FIG. 3 is a block diagram illustrating a system in which various cores may utilise a virtually indexed, physically tagged cache for at least one of their local cache levels, in accordance with one embodiment.

FIG. 3 illustrates a system in accordance with one embodiment. For ease of illustration, the system includes only two cores 100, 120, but additional processor cores may be provided, as indeed can other master devices that may or may not include their own local caches. The core 100 has various processor pipelines 105, one of which is a load/store pipeline 110 used to handle load and store operations. The load/store pipeline 110 can access one or more cache levels 115 provided locally within the core 100 by issuing access requests specifying virtual addresses. The core 120 is constructed similarly, having pipelines 125 including a load/store pipeline 130 that can issue access requests specifying virtual addresses to one or more cache levels 135 provided locally within the core 120. In the embodiment described herein, it will be assumed that the one or more cache levels 115, 135 include a level 1 data cache that is virtually indexed and physically tagged. Further lower levels of cache may be provided within the blocks 115, 135, such as local level 2 caches, which may for example be physically indexed and physically tagged. Irrespective of whether there are additional levels of cache, or just a level 1 cache, in each of the blocks 115, 135, in the event of a miss within the local cache levels, an access request will be propagated out to the coherent interconnect 140 along with a physical address. The coherent interconnect 140 includes snoop circuitry 155 which is used to implement a cache coherency protocol in order to ensure that data coherency exists between the various copies of data that may be held by the separate processor cores' local caches. In particular, by way of example, it is important that if processor core 120 has a data value in its local caches 135 which is more up-to-date than data held in any shared lower hierarchical cache levels 145 and/or memory 150, then if the processor core 100 requires access to that data and detects a miss in its local caches 115, it can be ensured that the processor core 100 will access the most up-to-date data.

The snoop circuitry 155 seeks to maintain a record indicating which cores it understands to have cached copies of data, that record keeping track of the physical addresses of the data and the cores that it believes to have locally cached that data. Accordingly, in the event of an access request being propagated from one of the processor cores along with a physical address, such an access request also being referred to herein as a linefill request, the snoop circuitry 155 can check its local record to see if that physical address is identified in its record, and if so which processor cores are indicated as having a copy of that data. It can then issue a snoop request to the relevant processor core(s) in order to cause each such processor core to access its local cache and perform a required coherency action in respect to its copy of the data. This may involve invalidating the local copy, and/or may involve that processor core outputting its copy of the data back to the snoop circuitry, so that it can then be returned to the requesting processor core. By way of example, it will hence be appreciated that if a miss occurs in the one or more cache levels 115 for an access request made by the processor core 100, and that the most up-to-date version of the data at that address resides in the local cache hierarchy 135 of processor core 120, this will be detected by the snoop circuitry 155, and via the snoop request that data can be retrieved and then provided back to the processor core 100.

Returning to the earlier mentioned problem of the potential adverse effects that aliasing can cause within a virtually indexed, physically tagged cache, the inventors have observed that such an aliasing condition can be detected by the snoop circuitry due to the fact that the snoop circuitry operates using physical addresses. In particular, by way of example, if the processor core 100 performs a lookup in its local virtually indexed, physically tagged cache based on a virtual address output by the load/store pipeline 110, and that results in a miss, then if the subsequent linefill request specifying a physical address is received by the snoop circuitry, and the snoop circuitry's records indicate that the processor core 100 does store a copy of the data at that physical address, this implies the presence of an aliasing condition. In particular, it is possible that the discrepancy has arisen due to the fact that the virtual address used to access the cache differs from the virtual address that was used to initially populate the level 1 cache with the data, and that hence the required data is in fact still in the cache, but in a different set to that accessible by the specified virtual address now being issued.

Figure 4:
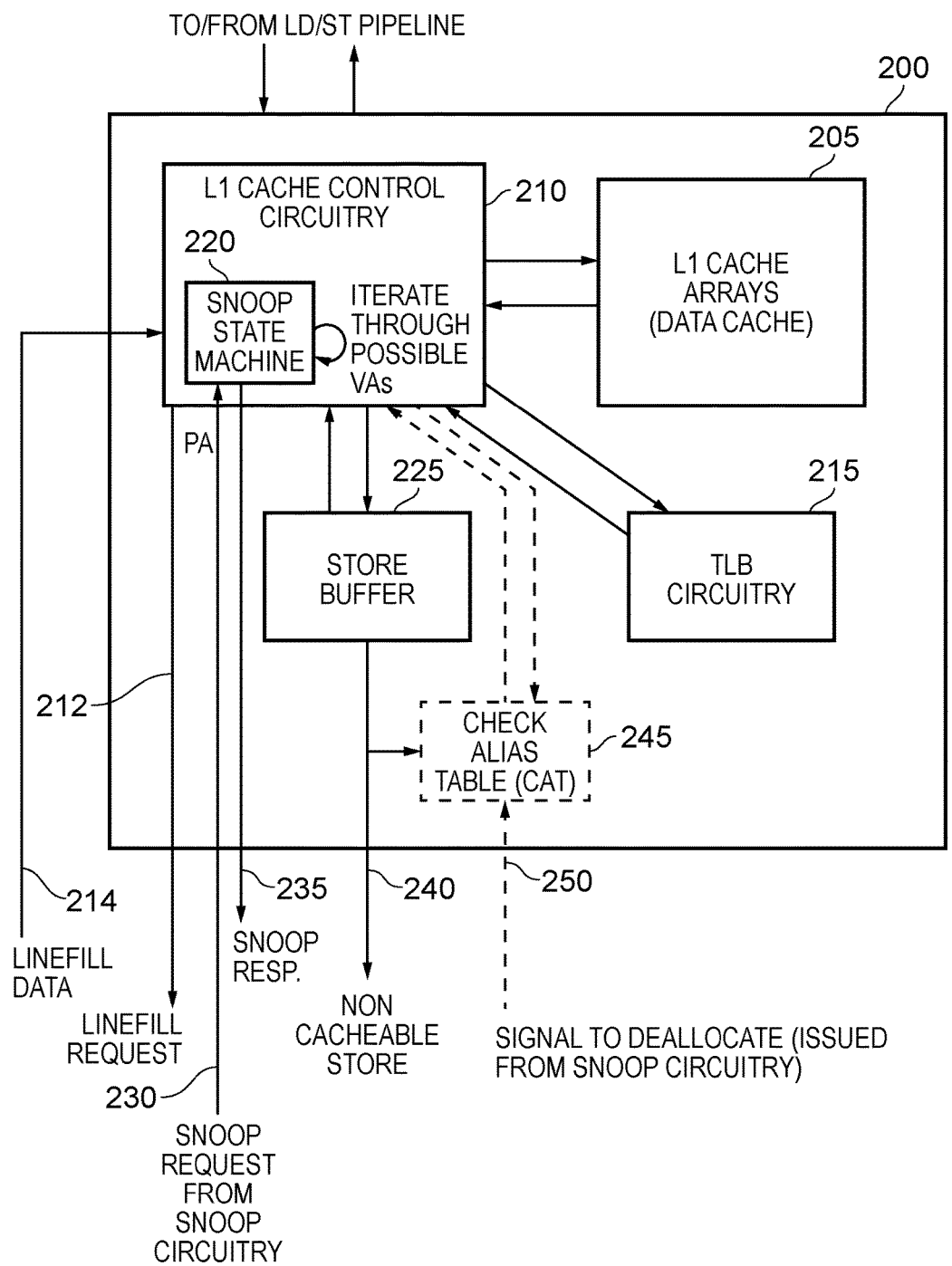
FIG. 4 is a block diagram illustrating in more detail components provided in association with a level 1 cache in accordance with one embodiment.

In one embodiment, in such a situation, the snoop circuitry 155 issues a snoop request back to the processor core 100 to cause it to invoke a snoop processing operation in order to detect and remove any such aliasing condition. This will be discussed in more detail with reference to FIG. 4. In particular, FIG. 4 shows a number of components 200 associated with a level 1 data cache. The level 1 cache arrays 205, which include both the tag arrays and data arrays illustrated earlier in FIG. 2, are accessed under the control of the level 1 cache control circuitry 210. TLB circuitry 215 is also accessed under the control of the cache control circuitry, so that virtual/physical address translation can be performed at the appropriate time. However, as discussed earlier, the initial lookup in the tag arrays can occur using the index portion of the specified virtual address, and the physical address is then only used subsequently to detect whether there is actually a hit condition.

In accordance with the described embodiments, a snoop state machine 220 (also referred to herein as snoop request processing circuitry) is provided within the level 1 cache control circuitry 210 that is responsive to the earlier mentioned snoop request from the snoop circuitry in order to implement a particular snoop processing operation so as to check for the presence of any aliasing condition. In particular, when the snoop circuitry 155 detects that a processor core issuing a linefill request following a miss condition in its local cache is indicated in the snoop circuit's own records as storing a copy of the data at the specified physical address, it will issue over path 230 a snoop request back to that processor core which specifies that an invalidate operation should be performed within the level 1 cache arrays. The snoop request also provides the physical address back to the state machine 220.

For the reasons discussed earlier, there will be multiple possible virtual address index portions that could be used to access the cache arrays for that specified physical address, due to the presence of the virtual address specific index bits. The snoop state machine 220 is hence arranged to iterate through all of the possible virtual addresses, and, for each virtual address, to perform a lookup in the cache array in order to determine whether there is a hit or not. In the absence of a hit condition being detected, the snoop state circuitry iterates through each possible virtual address in turn. However, as soon as a hit condition is detected, the hit entry can be invalidated, and the snoop processing operation can at that point terminate. Once a hit entry has been detected and invalidated, or all possible virtual addresses have been tried and no hit has been detected, the snoop state machine 220 will then issue a snoop response over path 235 back to the snoop circuitry 155.

FIG. 4 also shows other components which will be discussed in more detail in subsequent figures. As shown, when the level 1 cache control circuitry 210 performs a lookup in the level 1 cache arrays 205 in response to an access request from the load/store pipeline, and detects a miss, it will issue a linefill request over path 212 which will then trigger the snoop circuitry 155 to determine whether any other processor cores may store the data, and initiate snoop requests as required. If the required data is found in the local cache of one of the other processor cores, the snoop circuitry can then return that data as the linefill data over path 214. If that data is not found in any of the other local caches, then the request can be propagated on to the optional further cache levels 145 and/or memory 150 as required in order to access the relevant data, with the data then being provided over path 214 as linefill data.

If the access request from the load/store pipeline was a load access request, and that request was cacheable, then the data can be obtained directly from the cache arrays 205 in the event of a hit condition, or can be returned to the processor core from the cache control circuitry 210 when that data is received as linefill data over path 214. In one embodiment the data can be returned from the store buffer 225 if there is a hit in the store buffer (i.e. the data to be loaded is the subject of a pending store operation identified in the store buffer). Typically, the data returned will also be stored within the level 1 cache arrays so that it is then available for a subsequent access if required.

For a store access request, the load/store pipeline will only issue the store access request once a commit stage in the pipeline has been reached, and it can hence be ensured that it is safe to write the store data to memory. At this point, the store access request is stored within the store buffer 225. The contents of the store buffer entries will be discussed later with reference to FIG. 8, but in addition to the data to be written it will also include the physical address which will be determined by the TLB circuitry 215 from the supplied virtual address. It will also include any virtual address bits that are required for the index in order to access the cache.

Once an entry has been populated within the store buffer, a lookup within the cache arrays 205 can be performed by the cache control circuitry 210. If the store operation is a write exclusive operation, and hence it is known that the data is held exclusively by the relevant processor core, then in the event of a hit being detected the data can be written directly into the cache arrays. However, in the event of a miss, or if the write is not a write exclusive, then a linefill request will be issued over path 212 which will cause the snoop circuitry to perform any required coherency operations in order to invalidate any other local copies of the data. The most up-to-date current cache line's worth of data will then be returned over path 214, whereupon the data can be written into the cache by merging into that cache line the new write data stored within the store buffer entry of the store buffer 225. At this point, the entry can be invalidated in the store buffer.

In addition to cacheable store requests, the store buffer can also store non-cacheable store requests. These non-cacheable store requests can be output over path 240 from the store buffer to the lower levels of the cache hierarchy in order to cause the data to be written into one of those lower cache levels and/or to memory. A particular type of non-cacheable store request that can also be problematic with regards to the earlier-mentioned aliasing condition is a non-allocating store request. When a non-allocating store request is placed within the store buffer, a lookup is performed within the level 1 cache arrays 205 to determine whether the data is present, and if so the relevant cache line is updated with the new write data. However, in the event of a miss, the write data is merely propagated onto the lower levels of the cache hierarchy to be stored within the lower levels. However, if the miss occurs as a result of the earlier-mentioned aliasing issue, and in fact the level 1 cache array does store data for the relevant physical address, but within a set indexed using a different virtual address, then there is a potential problem that if a subsequent access request uses the same virtual address as the one that originally caused the data to be allocated into the cache, a cache hit will be detected, and the wrong data will be accessed. In particular, correct operation requires that the later access accesses the data as updated by the non-allocating store request. As will be discussed in more detail later, additional measures can be taken to detect and deal with such situations, and in one embodiment this involves the use of the Check Alias Table (CAT) 245 which retains physical address information for a certain period of time about non-allocating store requests that have missed within the cache, and hence have been output from the store buffer for onward propagation to the lower hierarchical levels of cache and/or memory.

Figure 5:
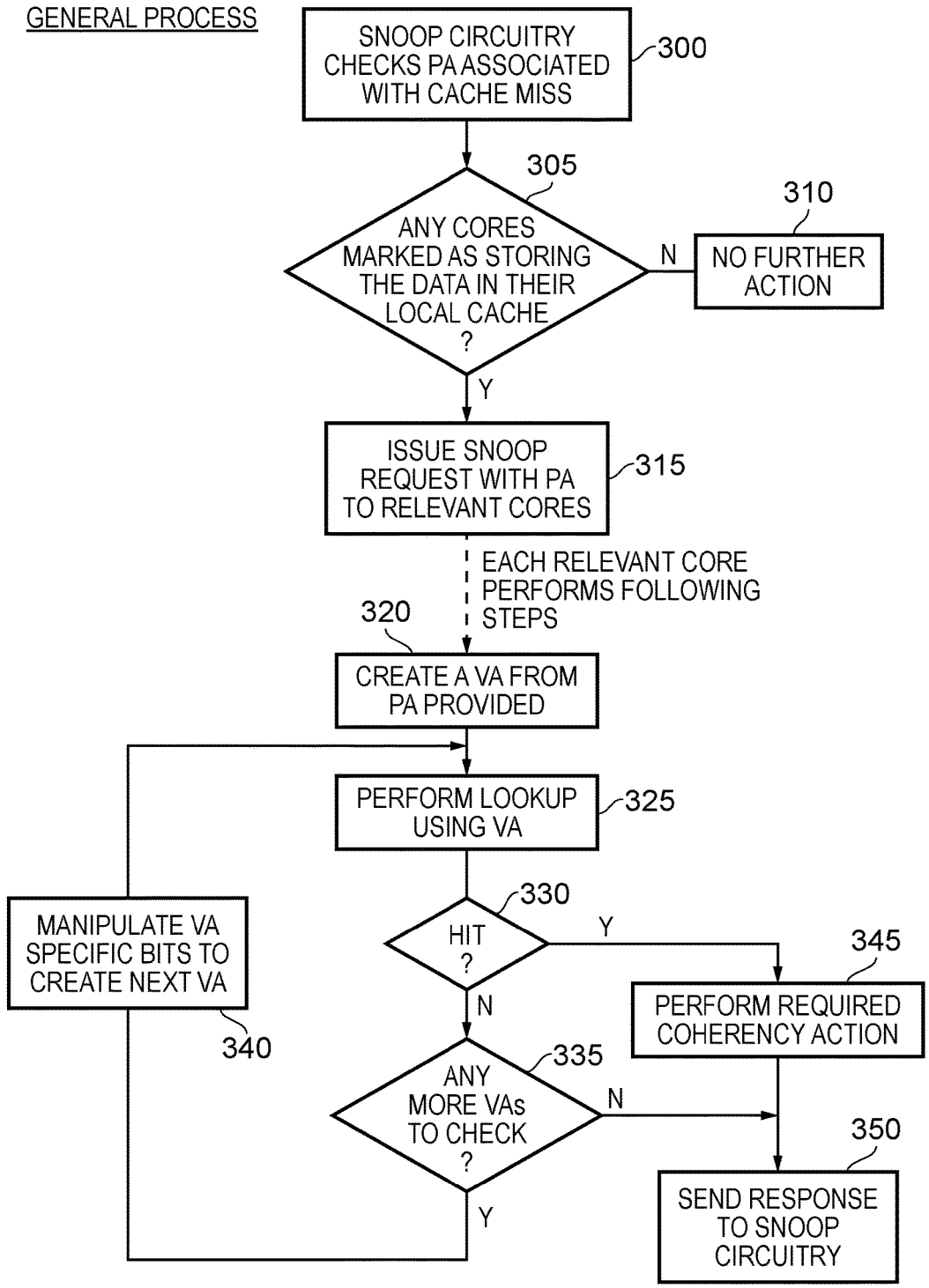
FIG. 5 is a flow diagram illustrating a process performed in one embodiment.

FIG. 5 is a flow diagram illustrating the general process performed when one of the processor cores 100, 120 issues a linefill request with a physical address to the coherent interconnect 140, following a cache miss in its local cache structure. At step 300, the snoop circuitry checks the physical address associated with the cache miss, to determine whether that physical address is in its local snoop records, and hence at step 305 determines whether any cores are marked in its record as storing the data at that physical address within their local cache. If not, then the process proceeds to step 310, and no further action is required with regards to cache coherency. As mentioned earlier, the linefill request will then be processed by the lower levels of the cache hierarchy and/or memory.

If any cores are marked as storing the data in their local cache at step 305, then the snoop circuitry 155 issues a snoop request to each of the relevant cores at step 315, specifying the physical address. Each core that receives such a snoop request then performs the steps shown in the remainder of FIG. 5. In particular, at step 320, the snoop state machine 220 creates a virtual address from the physical address provided, whereafter at step 325 a lookup is performed within the cache arrays 205 using that virtual address. It is then determined at step 330 whether a hit is detected, and if not it is then determined at step 335 whether there are any more virtual addresses to check. The number of different virtual address portions to use will depend on the number of virtual address specific bits within the virtual address index. In the earlier example where there are two virtual address specific bits, it will be appreciated that there will be four possible virtual address indexes to use. If it is determined that there are more virtual addresses to check, the process proceeds to step 340 where the virtual address specific bits are manipulated to create the next virtual address index, whereafter the process returns to step 325.

If a hit is detected at step 330, then a required coherency action is performed at step 345. The required coherency action will depend on the form of snoop request issued to the processor by the snoop circuitry. As mentioned earlier, it may merely require the data to be invalidated, or alternatively may require the data to be returned to the snoop circuitry, so that it can be forwarded to another core. Once the required coherency action has been taken, then a response is sent to the snoop circuitry 350. Again, the response will depend on the type of snoop request sent from the snoop circuitry, and hence may for example merely form an acknowledgement signal identifying to the snoop circuitry that the required snoop actions have been taken, or may additionally include data for the snoop circuitry to route to another core.

If at step 335 it is determined that there are no more virtual address indexes to check, then the process proceeds directly to step 350 where a response is sent to the snoop circuitry to indicate that all required steps have been taken by the core.

In one embodiment, the choice of the first virtual address chosen at step 320 can be arbitrary. However, in an alternative embodiment, the algorithm used by the operating system to map pages in memory may be used at step 320 to influence the first possible virtual address portion checked during the snoop processing operation. In one particular embodiment, the first possible virtual address portion is chosen to be that virtual address portion where the virtual address specific bits have values that are set equal to the corresponding physical address bit values. It has been found that there is an increased chance of finding a hit condition for that possible virtual address portion, and accordingly such an approach can statistically reduce the overhead involved in performing the snoop processing operation.

Figure 6:
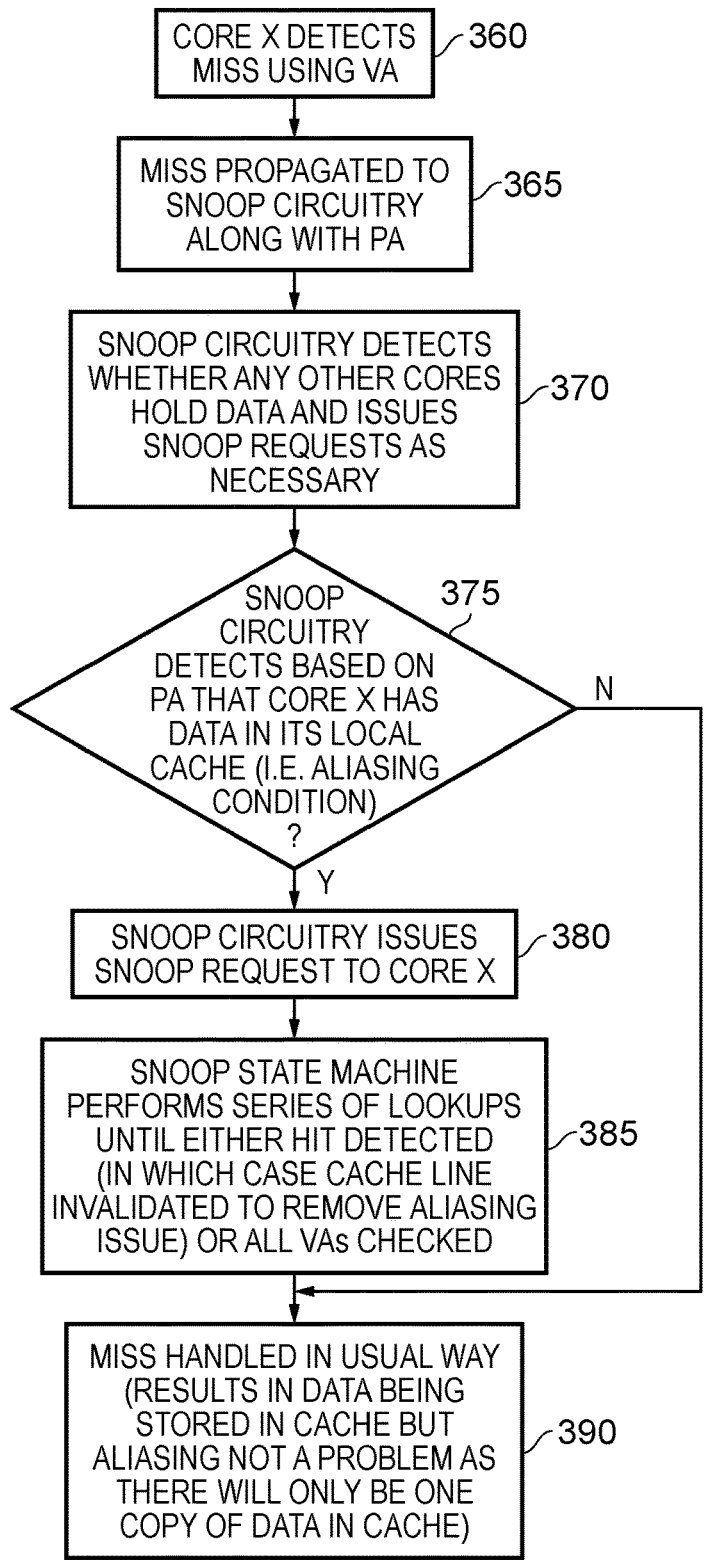
FIG. 6 is a flow diagram illustrating how the general approach of FIG. 5 can be used to remove an aliasing condition present within a cache, in accordance with one embodiment.

FIG. 6 is a flow diagram illustrating the sequence of steps that occur for the specific example where the snoop circuitry determines that a processor core that has indicated that it has had a miss in its local cache is actually identified by the snoop circuit's records as storing a copy of the required data. At step 360, core X detects a miss when performing a lookup using the virtual address provided by the load/store pipeline. At step 365, that miss is then propagated on to the snoop circuitry as a linefill request, along with the physical address as determined by the TLB circuitry 215. At step 370, the snoop circuitry detects whether any other cores hold the data for that physical address, and issues snoop requests as necessary. This involves the standard snoop activity, where if the snoop circuitry detects that any of the other cores other than core X hold the data for the specified physical address, it send appropriate snoop requests to those other cores.

However, in addition, at step 375, it is determined whether the snoop circuitry has detected, based on the physical address, that core X has the data for that physical address in its local cache, i.e. there is a so-called aliasing condition referred to earlier. If it does, then the snoop circuitry issues a snoop request to core X at step 380, in this instance the snoop request indicating that an invalidate action is required if a hit is detected when processing the snoop request.

At step 385, the snoop state machine 220 then performs a series of lookups using the mechanism described with reference to steps 320 to 350 of FIG. 5, the process continuing until either a hit is detected, in which case the cache line associated with that hit is invalidated in order to remove the aliasing condition, or until all of the possible virtual addresses have been checked and no hit has been detected. This latter situation is still possible even though the snoop circuitry's records indicate that core X does store a copy, due for example to race conditions which may arise where effectively the snoop records information is out-of-date by the time the relevant access is performed, and accordingly no hit is detected.

Following step 385, then the miss can be handled at step 390 in the usual way as discussed earlier, resulting in data being stored in the local cache of core X. However, at this point aliasing will not be a problem, as the process performed at step 385 of FIG. 6 will have removed any other copy, and accordingly it can be ensured that there will only be one copy of the data in the cache.

If at step 375 the snoop circuitry does not detect that core X has a copy of the data in its local cache, then steps 380 and 385 can be skipped, and the process proceeds directly to step 390.

Figure 7:
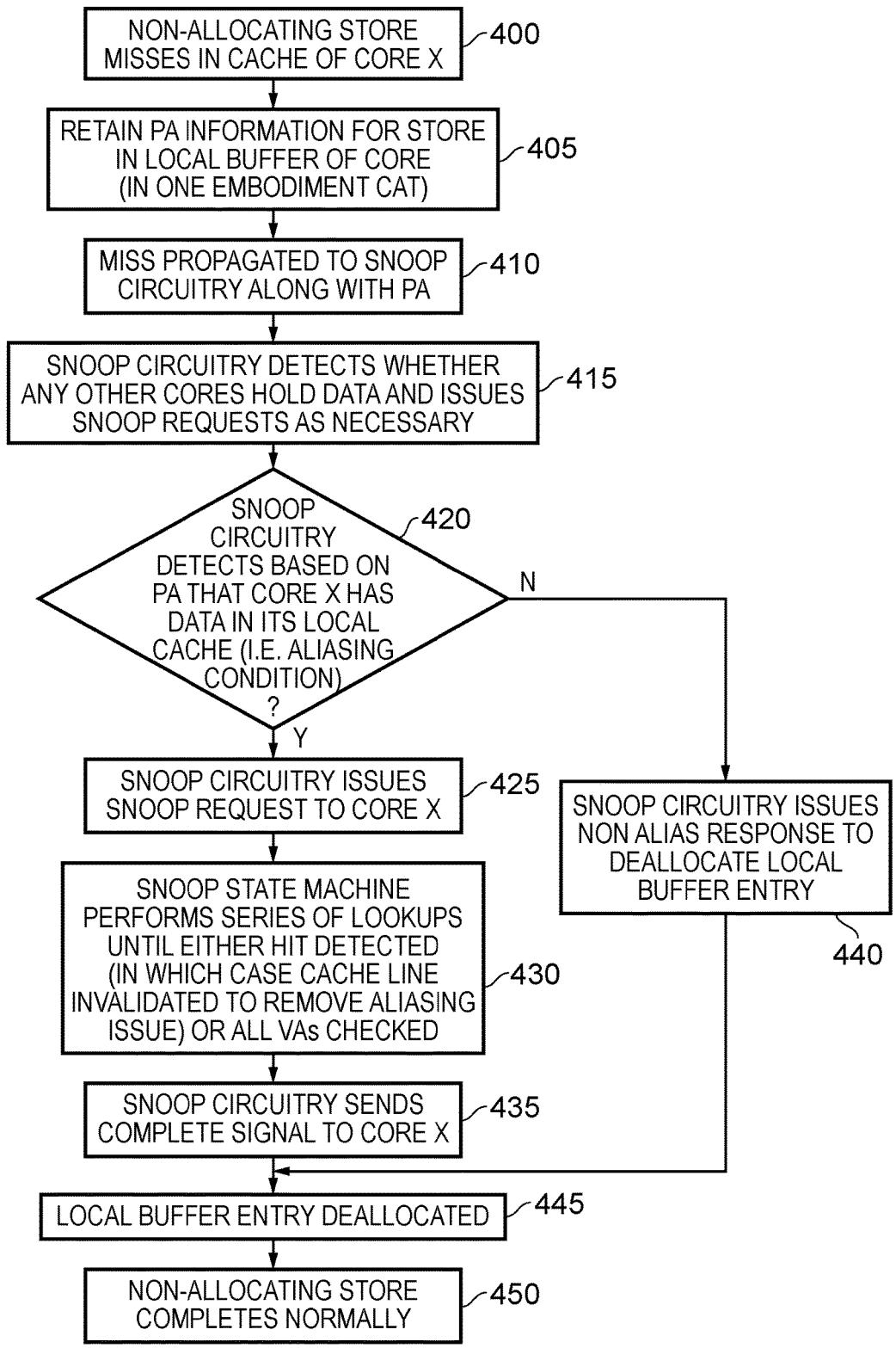
FIG. 7 is a flow diagram illustrating the processing of non-allocating store requests in accordance with one embodiment.

FIG. 7 is a flow diagram illustrating how a non-allocating store is handled in the event of a miss in the cache of one of the processor cores. As discussed earlier in relation to FIG. 4, a store access request will be placed in the store buffer 225 once it is issued from the load/store pipeline of the processor core. At step 400 a lookup within the L1 cache arrays 205 is performed and is assumed in this example to result in a miss in the cache. At step 405, physical address information for the store is retained in a local buffer of the core. Whilst in one embodiment this local buffer could be the store buffer 225 itself, the store buffer resources are relatively expensive, due to the amount of information that is typically retained within a store buffer entry, and hence in one embodiment a separate local buffer in the form of the earlier mentioned CAT 245 is used. In particular, once the miss has been detected in the cache, the non-allocating store will be output from the store buffer over path 240. A number of separate signals may in one embodiment be involved in this process. In particular, in one embodiment the store buffer will output a request, and on receipt of an acknowledgement for that request will then output the write data. At this point, the store buffer entry 225 will be cleared. In one embodiment, it is at this point that the physical address information for that store is then allocated an entry within the CAT 245, hence implementing step 405.

As indicated by step 410, the output of the store request from the store buffer essentially causes the miss to be propagated to the snoop circuitry along with the physical address. Accordingly, at step 415 the snoop circuitry detects whether any other cores hold the data, and issues snoop requests as necessary. In addition, it will also check whether its records indicate that core X itself has a copy of the data, as indicated by the decision box 420. In particular, if the snoop circuitry detects based on the physical address that core X has the data for that physical address in its local cache, i.e. the aliasing condition is present, then the process proceeds to step 425 where the snoop circuitry issues a snoop request to core X. Step 430 is then equivalent to step 385 discussed earlier with reference to FIG. 6, and causes the snoop state machine to remove the alias condition if it is in fact present, by invalidating any entry resulting in a hit condition when performing the snoop processing operation using the possible sequence of virtual addresses for the specified physical address.

After completing the snoop processing operation, the snoop state machine will send a response to the snoop circuitry, as discussed earlier with reference to step 350 of FIG. 5. At this point, the snoop circuitry will then send a complete signal to core X as indicated by step 435, and on receipt of the complete signal the local buffer entry is deallocated at step 445. When the local buffer takes the form of the earlier discussed CAT 245, then this deallocate signal is as shown by the dotted line 250 in FIG. 4. Following step 445, the non-allocating store then completes normally at step 450. The preceding actions as discussed with reference to step 430 will ensure that any potential aliasing problem is addressed, since the data that is the subject of the non-allocating store will be invalidated within the level 1 cache array if it exists.

As shown in FIG. 7, if the snoop circuitry does not consider that core X has the data at the specified physical address, then at step 440 it issues a non-alias response to core X, which allows the local buffer entry to then be deallocated at step 445. Such a non-alias response signal will also be provided over path 250 shown in FIG. 4.

FIG. 8 schematically illustrates the differences between the store buffer entries 500 and the equivalent CAT entries 530. The store buffer entry stores the physical address 510, along with the data to be stored 515. In addition, it may keep various status bits 520 indicative of the status of the store operation. Further, as shown in FIG. 8, it will store the virtual address bits 505 which are required for the index. In accordance with the earlier-mentioned example, this will be bits 13 and 12 of the virtual address. These bits need to be kept so that a lookup within the level 1 cache arrays 205 can be performed.

When the store request within the store buffer entry is issued to the lower level of the cache hierarchy, and accordingly deallocated from the store buffer, then as discussed earlier the physical address information is allocated into an entry 530 within the CAT 245. The CAT entry merely needs to keep the physical address 535, along with a flag of some description to identify whether the CAT entry is storing a valid physical address or not. In one embodiment, a valid bit 540 is used, which is set when the physical address is allocated into the CAT entry, and is cleared when that CAT entry is later deallocated on receipt of a signal from the snoop circuitry over path 250. By using the CAT 245 as a separate buffer to the store buffer 225, this avoids the need to keep the store access information within the store buffer entry 500 any longer than necessary. This is beneficial, since it will be appreciated from FIG. 8 that the store buffer entry 500 is relatively expensive in terms of area requirements when compared with the CAT entry 530. If instead the store buffer entry was retained until the deallocate signal was received, this could affect performance by preventing new stores being issued into the store buffer. By using the separate CAT entry, the store buffer can operate in its usual manner, and the relatively inexpensive CAT entries can be used to keep track of the physical addresses of non-allocating store requests that have missed in the cache, until such time as it can be confirmed that no aliasing condition exists.

Figure 9A:
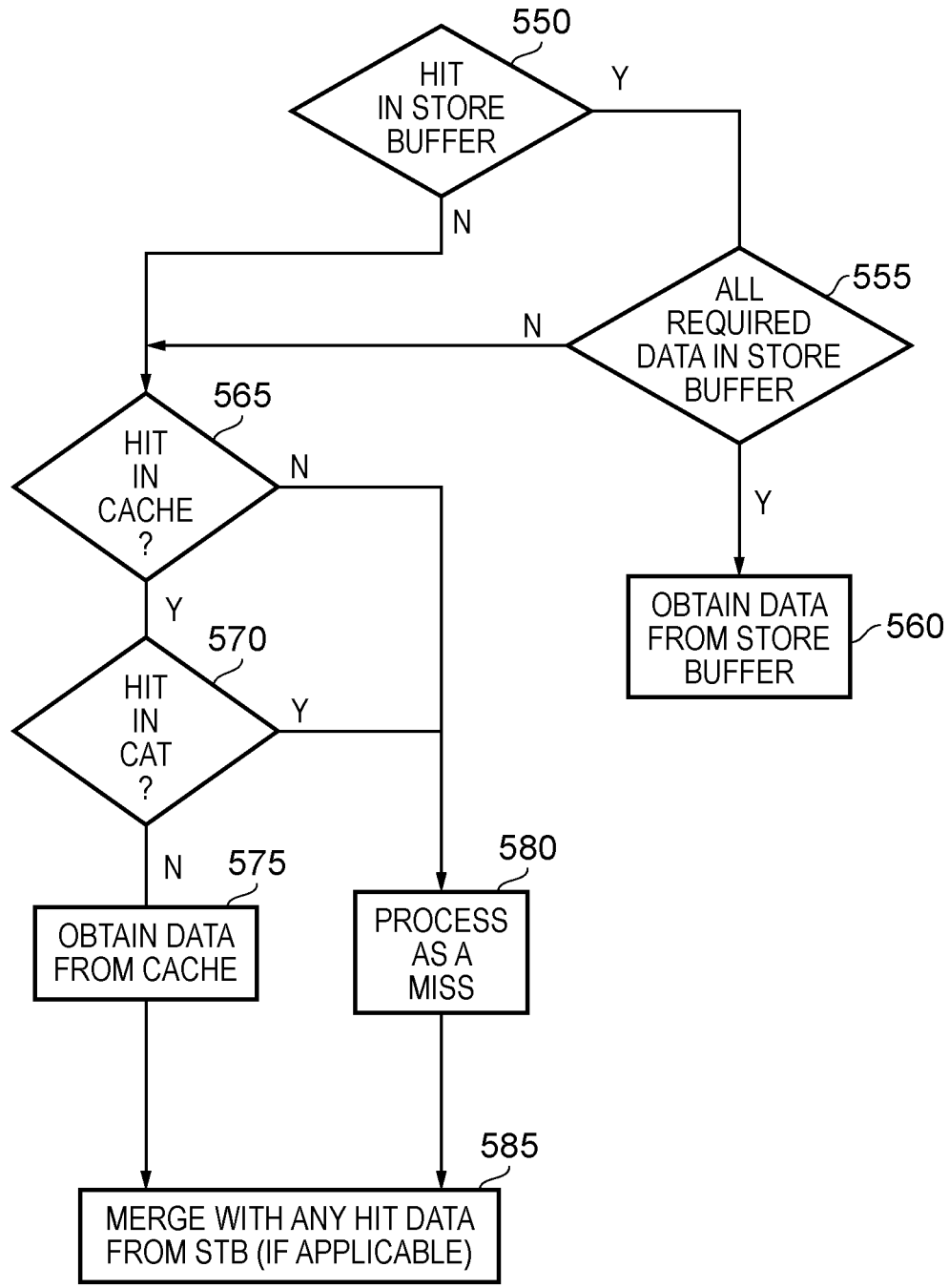
FIG. 9A is a flow diagram illustrating how cacheable load requests are processed when employing an embodiment that uses the check alias table.

FIG. 9A is a flow diagram illustrating how the CAT is used when handling a cacheable load request. At step 550, it is determined whether there is a hit in the store buffer, and if so it is determined at step 555 whether all of the required data specified by the load request is available from the store buffer. If so, then the data is obtained from the store buffer at step 560. However, if a hit is not detected at step 550, or it is determined at step 555 that not all of the required data is available in the store buffer, then the process proceeds to step 565, where it is determined whether there is a hit in the cache.

If there is not a hit in the cache, then the load request is processed as a miss at step 580. The returned data is then provided to the processor, and as indicated by step 585, the data obtained by processing the cache miss may be merged with any hit data obtained from the store buffer at step 550.

However, if there is a hit in the cache, then at step 570 it is determined whether there is also a hit in the CAT. If not, then the process proceeds to step 575 where the data is obtained from the cache, and then optionally subjected to step 585 if some of the required data was found to be present in the store buffer. However, if there is a hit in the CAT, then effectively the hit in the cache detected at step 565 is disregarded, and instead the load request is processed as a miss at step 580.

Whilst FIG. 9A logically illustrates the decision process, it will be appreciated that the various checks need not be performed in the order illustrated in FIG. 9A. For example, the cache lookup may proceed in parallel with any check in respect of the contents of the CAT, and in particular the cache can be indexed using the virtual address whilst the physical address is being calculated by the TLB, and then when the physical address is available a check in the CAT can be performed. This may, if desired, be performed in parallel with the comparison of the physical address tag bits with the tag bits of the entries accessed within the cache based on the virtual index.

The following sample sequence of access requests will be used to demonstrate why the process of FIG. 9A prevents any incorrect operation due to aliasing:

(1) Load@PA, @VA
(2) Streaming Store@PA, @VA_2
(3) Load@PA, @VA

As per this example, the three instructions access the same physical address, but the loads (1) and (3) also have the same virtual address, whilst the streaming store (2) uses a different virtual address. If it is assumed that load (1) hits in the cache and then the streaming store (2) misses due to its virtual address accessing a different set, at this point the streaming store will leave the core and be issued to the next level of memory. In due course, when the store is processed by the snoop circuitry, an invalidation snoop request will be sent to the core, and the earlier-described processes will be performed to remove the invalid line. However, it is possible that the load (3) is issued to the cache control circuitry before that invalidation is received, and accordingly when that lookup is processed a hit will be detected in the cache and an incorrect value would be retrieved.

However, when incorporating the CAT 245 of the above described embodiments, there is no possibility for the load (3) to be provided with the wrong data, since it will be determined that there is a hit in the CAT for that physical address, and hence that load (3) will be treated as if it has missed within the cache, as indicated by the path from step 570 to step 580 in FIG. 9A. This will force the load (3) to obtain the correct data, namely the data written by the streaming store.

Figure 9B:
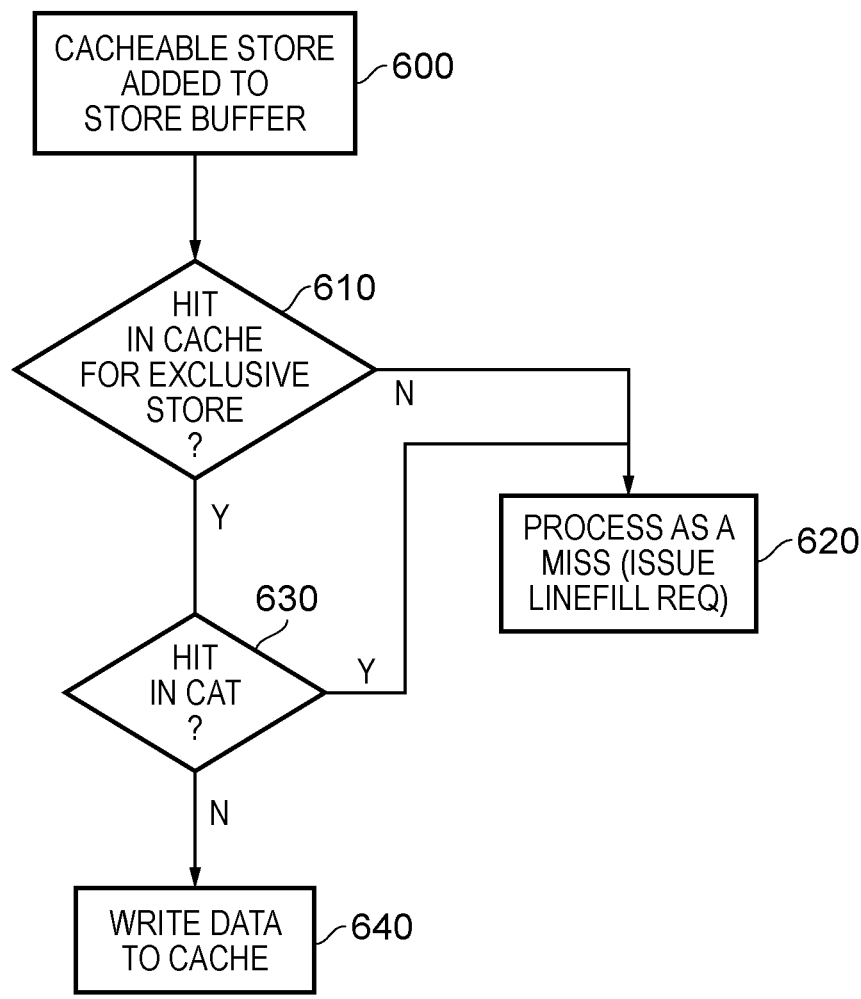
FIG. 9B is a flow diagram illustrating how cacheable store requests are processed when employing an embodiment that uses the check alias table.

FIG. 9B is a flow diagram illustrating how a cacheable store request is handled when the CAT 245 is used as described above. At step 600, the cacheable store will be added to the store buffer, either as a new entry, or merged with an existing entry. However since the store is a cacheable store, it could not be merged with an existing non-allocatable store that is already within the store buffer relating to the same physical address, and the store buffer is arranged to ensure that at any point in time only one entry can store a pending store request relating to a particular physical address. Hence, by the time the cacheable store is added to the store buffer at step 600, it can be ensured that there is no pending non-allocatable store to that same physical address pending in the store buffer.

At step 610 it is determined whether there is a hit in the cache. More particularly, if the cacheable store is an exclusive store, and there is a hit in the cache, then the process will proceed to step 630, where it will be determined whether there is a hit in the CAT. If there is not a hit in the CAT, then the data is written into the cache by updating the relevant cache line at step 640. However, if there is a hit in the CAT the process proceeds to step 620 where the access is processed as a miss by issuing a linefill request. The process also proceeds directly from step 610 to step 620 in the event that a hit is not detected in the cache for an exclusive store.

By adding in the additional check at step 630, rather than allowing the hit detected at step 610 to always allow the data to be written into the cache 640, this prevents the possibility that a cache line within the cache will be updated incorrectly. In particular, by instead treating the access as missing in the cache, this will ensure that the non-allocating store request is processed before the update performed by the cacheable store takes place. This hence ensures correct operation, even in situations where the cacheable store request is only updating part of the data in a cache line.

Figure 10:
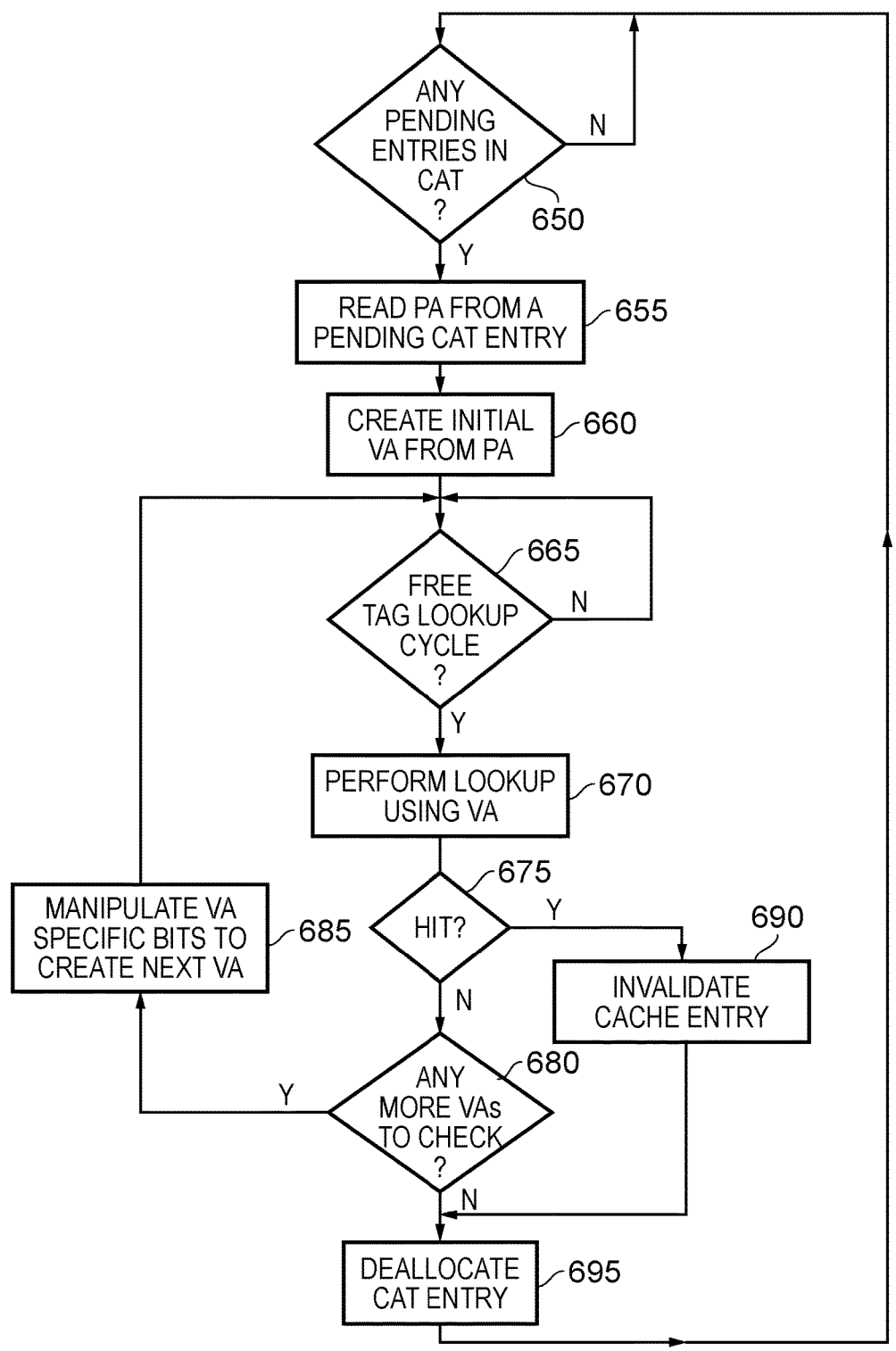
FIG. 10 is a flow diagram illustrating how the snoop state machine functionality may be extended in one embodiment to detect and remove alias conditions as a background activity.

FIG. 10 is a flow diagram illustrating an optional extension that can be made to the functionality of the snoop state machine 220 in order to seek to detect potential aliasing conditions, and remove them as a background task. At step 650, the snoop state machine 220 determines whether there are any pending entries in the CAT 245. When it is determined that there is at least one pending entry, then the physical address is read from one of those pending CAT entries at 655. In the event of multiple pending entries, then any suitable selection process can be performed, in one embodiment an entry being chosen at random. Thereafter, the snoop state machine 220 generates an initial virtual address from the physical address at step 660 in much the same way as it would for the process discussed earlier with reference to step 320 of FIG. 5.

At step 665, it is then determined whether there is a free tag lookup cycle. If not, the process waits. This is due to the fact that the activity described in FIG. 10 is treated as a lower priority than any active snoop requests that need processing, or any access requests from the core that require lookups to be performed within the level 1 cache array. However, whenever there is a free tag lookup cycle, the process will proceed to step 670 where a lookup is performed within the cache using the virtual address. It is then determined at step 675 whether there is a hit, and if not it is determined at step 680 whether any more virtual address indexes need to be checked for the physical address. If so, then the process proceeds to step 685 where the virtual address specific bits are manipulated to create the next virtual address index, whereafter the process returns to step 665 to await another free tag lookup cycle in order to test the next virtual address index.

If a hit is detected at step 675, then the relevant cache entry is invalidated at step 690, and the process proceeds to step 695 where the CAT entry can now be deallocated since the aliasing condition has been removed.

Similarly, if at step 680 all virtual address indexes have been checked and no hit has been detected, then it can be confirmed that there is no aliasing condition and again the CAT entry can be deallocated at step 695. Following step 695, the process returns to step 650 to see if there are any other pending entries in the CAT 245. By such an approach, it is possible to seek to resolve potential aliasing conditions as a background task, without needing to await a subsequent cacheable access request triggering the process to remove potential alias conditions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
processing circuitry to perform data processing operations on data;
a cache storage to store data for access by the processing circuitry, the cache storage having a plurality of cache entries, and each cache entry arranged to store data and an associated physical address portion, the cache storage being accessed using a virtual address portion of a virtual address in order to identify a number of cache entries whose stored physical address portions are to be compared with a physical address derived from the virtual address in order to detect whether a hit condition exists; and
snoop request processing circuitry, responsive to a snoop request specifying a physical address, to determine a plurality of possible virtual address portions for the physical address, and to perform a snoop processing operation in order to determine whether the hit condition is detected for a cache entry when accessing the cache storage using the plurality of possible virtual address portions, and on detection of the hit condition to perform a coherency action in respect of the cache entry causing the hit condition.

2. An apparatus as claimed in claim 1, wherein the snoop request processing circuitry is arranged to complete the snoop processing operation once the hit condition has been detected and the coherency action performed in respect of the cache entry causing the hit condition.

3. An apparatus as claimed in claim 2, wherein, in the absence of the hit condition being detected, the snoop request processing circuitry is arranged to complete the snoop processing operation once the cache storage has been accessed using the plurality of possible virtual address portions.

4. An apparatus as claimed in claim 1, wherein the virtual address portion comprises a first subset of bits whose values are equal to corresponding bits in the physical address, and a second subset of bits that are specific to the virtual address.

5. An apparatus as claimed in claim 1, further comprising:
request issuing circuitry, responsive to the cache storage detecting a miss condition for said number of cache entries accessed using the virtual address portion of a first virtual address, to issue an access request specifying a first physical address derived from the first virtual address;
the snoop request received by the snoop request processing circuitry is generated in response to external snoop circuitry indicating that data for the first physical address is stored in the cache storage, thereby indicating an aliasing condition; and
the snoop request processing circuitry is arranged, through performance of the snoop processing operation, to remove the aliasing condition.

6. An apparatus as claimed in claim 5, wherein:
the snoop request processing circuitry is arranged to perform, as the coherency action, an invalidate operation to invalidate the cache entry causing the hit condition, so as to remove the aliasing condition by invalidating in the cache the cache entry whose stored data is associated with the first physical address but which is accessed using a virtual address portion derived from a virtual address different to the first virtual address.

7. An apparatus as claimed in claim 5, further comprising:
buffer circuitry to allocate to a buffer entry the physical address associated with a non-allocating store request issued by the processing circuitry and for which the miss condition is detected in the cache storage; and
the buffer circuitry is arranged to be responsive to a deallocation signal from the external snoop circuitry to deallocate the physical address from the buffer entry of the buffer circuitry.

8. An apparatus as claimed in claim 7, wherein:
the snoop request processing circuitry is arranged to issue a response signal to the external snoop circuitry once the snoop processing operation has completed; and
the buffer circuitry is arranged to receive the deallocation signal from the external snoop circuitry once the external snoop circuitry has received said response signal.

9. An apparatus as claimed in claim 7, wherein:
when the external snoop circuitry determines that data for the physical address is not stored in the cache storage, the buffer circuitry is arranged to receive the deallocation signal from the external snoop circuitry, and the snoop request is not issued to the snoop request processing circuitry.

10. An apparatus as claimed in claim 7, further comprising:
store buffer circuitry to store pending store requests;
a process of removing the non-allocating store request from the store buffer circuitry triggering said buffer circuitry to allocate the physical address of the non-allocating store request to the buffer entry.

11. An apparatus as claimed in claim 10, wherein the non-allocating store request is removed from the store buffer circuitry after the request issuing circuitry issues a corresponding access request specifying the physical address for the non-allocating store request, following a miss condition being detected in the cache storage.

12. An apparatus as claimed in claim 7, further comprising:
buffer checking circuitry, responsive to a cacheable access request issued by the processing circuitry, to check whether the physical address for that cacheable access request is already allocated to a buffer entry of the buffer circuitry; and
the miss condition is considered to exist when the physical address for that cacheable access request is determined to be already allocated to a buffer entry of the buffer circuitry, irrespective of a result of an access to the cache storage using the virtual address portion associated with the cacheable access request.

13. An apparatus as claimed in claim 7, wherein:
the snoop request processing circuitry is arranged to monitor the buffer circuitry, and responsive to a buffer entry having been allocated a physical address, to determine a plurality of possible virtual address portions for the physical address, and to perform an aliasing removal operation in order to determine whether the hit condition is detected for a cache entry when accessing the cache storage using the plurality of possible virtual address portions, and on detection of the hit condition to perform an invalidation of the cache entry causing the hit condition.

14. An apparatus as claimed in claim 13, wherein the aliasing removal operation is performed as a background task of the snoop request processing circuitry.

15. An apparatus as claimed in claim 1, wherein the virtual address portion comprises a first subset of bits whose values are equal to corresponding bits in the physical address, and a second subset of bits that are specific to the virtual address, wherein the snoop request processing circuitry is arranged to select, as a first possible virtual address portion amongst said plurality of possible virtual address portions, the virtual address portion whose second subset of bits has a value equal to a corresponding subset of bits of the physical address.

16. A system comprising:
a plurality of processing units having cache storages, at least one of the processing units comprising an apparatus having:
processing circuitry to perform data processing operations on data;
a cache storage to store data for access by the processing circuitry, the cache storage having a plurality of cache entries, and each cache entry arranged to store data and an associated physical address portion, the cache storage being accessed using a virtual address portion of a virtual address in order to identify a number of cache entries whose stored physical address portions are to be compared with a physical address derived from the virtual address in order to detect whether a hit condition exists; and
snoop request processing circuitry, responsive to a snoop request specifying a physical address, to determine a plurality of possible virtual address portions for the physical address, and to perform a snoop processing operation in order to determine whether the hit condition is detected for a cache entry when accessing the cache storage using the plurality of possible virtual address portions, and on detection of the hit condition to perform a coherency action in respect of the cache entry causing the hit condition; and
snoop circuitry to implement a cache coherency protocol in respect of the cache storages of the plurality of processing units;
the snoop circuitry being arranged to issue the snoop request to the snoop request processing circuitry of said apparatus.

17. A method of operating an apparatus, comprising:
employing processing circuitry to perform data processing operations on data;
employing a cache storage to store data for access by the processing circuitry, the cache storage having a plurality of cache entries, each cache entry storing data and an associated physical address portion;
accessing the cache storage using a virtual address portion of a virtual address in order to identify a number of cache entries;
comparing the physical address portions of said identified number of cache entries with a physical address derived from the virtual address in order to detect whether a hit condition exists; and
responsive to a snoop request specifying a physical address, determining a plurality of possible virtual address portions for the physical address, and performing a snoop processing operation in order to determine whether the hit condition is detected for a cache entry when accessing the cache storage using the plurality of possible virtual address portions, and on detection of the hit condition performing a coherency action in respect of the cache entry causing the hit condition.

18. An apparatus, comprising:
means for performing data processing operations on data;
means for storing data for access by the means for performing, the means for storing having a plurality of cache entries, and each cache entry for storing data and an associated physical address portion, the means for storing being accessed using a virtual address portion of a virtual address in order to identify a number of cache entries whose stored physical address portions are to be compared with a physical address derived from the virtual address in order to detect whether a hit condition exists; and
means for determining, in response to a snoop request specifying a physical address, a plurality of possible virtual address portions for the physical address, and for performing a snoop processing operation in order to determine whether the hit condition is detected for a cache entry when accessing the means for storing using the plurality of possible virtual address portions, and on detection of the hit condition for performing a coherency action in respect of the cache entry causing the hit condition.

* * * * *